(12) United States Patent
Sutaria et al.

(10) Patent No.: US 7,796,742 B1
(45) Date of Patent: Sep. 14, 2010

(54) SYSTEMS AND METHODS FOR SIMPLIFIED PROVISIONING

(75) Inventors: Jay Sutaria, Mountain View, CA (US); Brian Daniel Gustafson, Montara, CA (US); Robert Paul van Gent, Redwood City, CA (US); Ruth Lin, Santa Clara, CA (US); David Merriwether, Menlo Park, CA (US); Parvinder Sawhney, Fremont, CA (US)

(73) Assignee: SEVEN Networks, Inc., Redwood City, CA (US)

( * ) Notice: Subject to any disclaimer, the term of this patent is extended or adjusted under 35 U.S.C. 154(b) by 1395 days.

(21) Appl. No.: 11/112,690

(22) Filed: Apr. 21, 2005

(51) Int. Cl.
*H04M 3/42* (2006.01)
*H04M 11/00* (2006.01)

(52) U.S. Cl. .............................. 379/201.02; 379/93.03; 379/201.12

(58) Field of Classification Search .............. 379/15.03, 379/201.01, 201.02, 201.03, 201.05, 201.12, 379/93.02, 93.03, 188, 198, 194; 455/414.1
See application file for complete search history.

(56) References Cited

U.S. PATENT DOCUMENTS

| | | | |
|---|---|---|---|
| 4,831,582 A | 5/1989 | Miller et al. |
| 4,875,159 A | 10/1989 | Cary et al. |
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,559,800 A | 9/1996 | Mousseau et al. |
| 5,572,643 A | 11/1996 | Judson |
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |

(Continued)

FOREIGN PATENT DOCUMENTS

EP 1422899 A1 5/2004

(Continued)

OTHER PUBLICATIONS

Allchin, James E., "An Architecture for Reliable Decentralized Systems", UMI Dissertation Services, Copyright 1983.

(Continued)

*Primary Examiner*—Binh K Tieu
(74) *Attorney, Agent, or Firm*—Carr & Ferrell LLP

(57) ABSTRACT

A system and method for simplified provisioning is provided. The method comprises storing information associated with a user during a non-provisioning event. The information is utilized to pre-fill a registration related to a provisioning event. One or more communications are forwarded to the user requesting information to complete the registration for the provisioning event based on the information stored.

15 Claims, 4 Drawing Sheets

U.S. PATENT DOCUMENTS

| | | | |
|---|---|---|---|
| 5,701,423 | A | 12/1997 | Crozier |
| 5,704,029 | A | 12/1997 | Wright, Jr. |
| 5,706,502 | A | 1/1998 | Foley et al. |
| 5,710,918 | A | 1/1998 | Lagarde et al. |
| 5,713,019 | A | 1/1998 | Keaten |
| 5,715,403 | A | 2/1998 | Stefik |
| 5,717,925 | A | 2/1998 | Harper et al. |
| 5,721,908 | A | 2/1998 | Lagarde et al. |
| 5,721,914 | A | 2/1998 | DeVries |
| 5,727,202 | A | 3/1998 | Kucala |
| 5,729,735 | A | 3/1998 | Meyering |
| 5,745,360 | A | 4/1998 | Leone et al. |
| 5,752,246 | A | 5/1998 | Rogers et al. |
| 5,757,916 | A | 5/1998 | MacDoran et al. |
| 5,758,150 | A | 5/1998 | Bell et al. |
| 5,758,354 | A | 5/1998 | Huang et al. |
| 5,765,171 | A | 6/1998 | Gehani et al. |
| 5,778,346 | A | 7/1998 | Frid-Neilsen et al. |
| 5,785,355 | A | 7/1998 | Main |
| 5,787,441 | A | 7/1998 | Beckhardt |
| 5,790,425 | A | 8/1998 | Wagle |
| 5,790,790 | A | 8/1998 | Smith |
| 5,799,318 | A | 8/1998 | Cardinal et al. |
| 5,802,312 | A | 9/1998 | Lazardis et al. |
| 5,832,483 | A | 11/1998 | Barker |
| 5,857,201 | A | 1/1999 | Wright, Jr. et al. |
| 5,862,223 | A | 1/1999 | Walker et al. |
| 5,870,759 | A | 2/1999 | Bauer et al. |
| 5,898,780 | A | 4/1999 | Liu et al. |
| 5,909,689 | A | 6/1999 | Van Ryzin |
| 5,943,676 | A | 8/1999 | Boothby |
| 5,961,590 | A | 10/1999 | Mendez |
| 5,968,131 | A | 10/1999 | Mendez et al. |
| 6,006,274 | A | 12/1999 | Hawkins et al. |
| 6,023,708 | A | 2/2000 | Mendez et al. |
| 6,044,381 | A | 3/2000 | Boothby et al. |
| 6,085,192 | A | 7/2000 | Mendez et al. |
| 6,119,171 | A | 9/2000 | Alkhatib |
| 6,131,096 | A | 10/2000 | Ng et al. |
| 6,131,116 | A | 10/2000 | Riggins et al. |
| 6,138,124 | A | 10/2000 | Beckhardt |
| 6,141,664 | A | 10/2000 | Boothby |
| 6,151,606 | A | 11/2000 | Mendez |
| 6,170,014 | B1 | 1/2001 | Darago et al. |
| 6,212,529 | B1 | 4/2001 | Boothby et al. |
| 6,223,187 | B1 | 4/2001 | Boothby et al. |
| 6,233,341 | B1 | 5/2001 | Riggins |
| 6,324,542 | B1 | 11/2001 | Wright, Jr. et al. |
| 6,430,602 | B1 * | 8/2002 | Kay et al. ............... 709/206 |
| 6,535,892 | B1 | 3/2003 | LaRue et al. |
| 6,615,253 | B1 | 9/2003 | Bowman-Amuah |
| 6,625,621 | B2 | 9/2003 | Tan et al. |
| 6,671,757 | B1 | 12/2003 | Multer et al. |
| 6,708,221 | B1 | 3/2004 | Mendez et al. |
| 6,799,190 | B1 | 9/2004 | Boothby |
| 6,886,030 | B1 | 4/2005 | Easterbrook |
| 6,965,917 | B1 | 11/2005 | Aloni |
| 6,987,734 | B2 * | 1/2006 | Hundemer ............... 370/237 |
| 7,100,821 | B2 | 9/2006 | Rasti |
| 7,149,780 | B2 | 12/2006 | Quine et al. |
| 7,240,095 | B1 | 7/2007 | Lewis |
| 7,373,386 | B2 | 5/2008 | Gardner et al. |
| 2001/0034225 | A1 | 10/2001 | Gupte |
| 2003/0084165 | A1 | 5/2003 | Kjellberg |
| 2004/0006630 | A1 | 1/2004 | Friend et al. |
| 2004/0049599 | A1 | 3/2004 | Friend et al. |
| 2004/0054739 | A1 | 3/2004 | Friend et al. |
| 2004/0082346 | A1 * | 4/2004 | Skytt et al. ............... 455/456.3 |
| 2004/0128375 | A1 | 7/2004 | Rockwell |
| 2004/0133626 | A1 | 7/2004 | Herrero et al. |
| 2004/0167966 | A1 | 8/2004 | Lee et al. |
| 2004/0268148 | A1 | 12/2004 | Karjala et al. |
| 2005/0010694 | A1 | 1/2005 | Ma et al. |
| 2005/0055578 | A1 | 3/2005 | Wright et al. |
| 2005/0094625 | A1 | 5/2005 | Bouat |
| 2006/0031365 | A1 * | 2/2006 | Kay et al. ............... 709/206 |
| 2006/0069687 | A1 | 3/2006 | Cui |
| 2006/0149843 | A1 * | 7/2006 | Rhoads et al. ............... 709/227 |
| 2006/0165226 | A1 * | 7/2006 | Ernst et al. ............... 379/114.01 |
| 2006/0168043 | A1 * | 7/2006 | Eisenberger et al. ........ 709/206 |
| 2006/0190984 | A1 | 8/2006 | Heard et al. |
| 2007/0118620 | A1 | 5/2007 | Cartmell et al. |

FOREIGN PATENT DOCUMENTS

| | | |
|---|---|---|
| WO | 9824257 | 6/1998 |
| WO | 0130130 A2 | 5/2001 |
| WO | 2004045171 A1 | 5/2004 |
| WO | 03098890 A1 | 11/2004 |
| WO | 2005015925 A2 | 2/2005 |
| WO | 2005020108 A1 | 3/2005 |

OTHER PUBLICATIONS

Lotus Development Corporation, Lotus Notes Release 3.1. The Groupware Standard, Administrator's Guide-Server for NetWare, OS/2 and UNIX, 1989.

Lotus Development Corporation, Lotus Notes Release 3.1. The Groupware Standard, Site and Systems Planning Guide, 1991.

Wilcox, Adam A., PC Learning Labs Teaches Lotus Notes 3.0: The Quick and Easy Way to Learn, Ziff-Davis Press, 1993.

Lotus Development Corporation, Lotus Notes Release 3.3: Start Here, Workstation Install for Windows, OS/2 and Macintosh, 1993.

Lotus Development Corporation, Lotus Notes Release 3.1: Administrator's Guide-Server for Windows, 1993.

Lotus Development Corporation, Lotus Notes Release 3.1: The GroupWare Standard, Customer Services Application Guide, 1994.

Lotus Development Corporation, Lotus Notes Release 3.1: The GroupWare Standard, Getting Started with Application Development, 1994.

Lotus Development Corporation, Lotus Notes Release 3.1: The GroupWare Standard, Network Driver Documentation, 1994.

Kornblith, Polly R., Lotus Notes Answers: Certified Tech Support, Covers Lotus Notes Release 3, Osborne McGraw-Hill, 1994.

Freeland, Pat and Londergan, Stephen, Lotus Notes 3/3.1 for Dummies TM, IDG Books Worldwide, 1994.

Gewirtz, David, Lotus Notes 3 Revealed! Your Guide to Managing Information and Improving Communication Throughout Your Organization, Prima Publishing, 1994.

Shafran, Andrew B., Easy Lotus Notes for Windows™, QueÒ Corporation, 1994.

Lotus Development Corporation, Lotus Notes Release 3.3: The Groupware Standard, Administration, 1994.

McMullen, Melanie, Editor, Network Remote Access and Mobile Computing, Miller Freeman, Inc., 1994.

Lotus Development Corporation, Lotus Notes: The Groupware Standard-Windows, 1994.

IntelliLink Corporation, IntelliLink® For Windows User's Guide, Version 3.0, 1994.

Lotus Development Corporation, Lotus Notes Release 4: InterNotes Web Navigator Administrator's Guide, 1995.

Lotus Development Corporation, Lotus Notes Release 4 Install Guide for Servers, 1995.

Lotus Development Corporation, Lotus Notes Release 4.1 Release Notes, 1995.

Lotus Development Corporation, Lotus Notes Release 4 Migration Guide, 1995.

Lotus Development Corporation, Lotus Notes Release 4 Database Manager's Guide, 1995.

Lotus Development Corporation, Lotus Notes Release 4 Install Guide for Workstations, 1995.

Lotus Development Corporation, Lotus Step by Step: A Beginner's Guide to Lotus Notes, 1995.

Lotus Development Corporation, Lotus Notes Release 4 Programmer's Guide Part 1, 1995.

Lotus Development Corporation, Lotus Notes Release 4 Programmer's Guide Part 2, 1995.
Lotus Development Corporation, Lotus Notes Release 4 Administrator's Guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering LotusÒ NotesÒ, SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, Administrator's Guide, Netscape Mail Server, Version 2.0, 1995.
Pyle, Hugh, "The Architecture of Lotus Notes", Lotus Notes Advisor, Advisor Publications, Premiere Issue 1995, pp. 18-27.
Lotus Notes Advisor, Advisor Publications, Jun. 1995, entire magazine.
IBM, "The Architecture of Lotus Notes", White Paper, No. 114654, Modified date: May 31, 1995.
Lotus Development Corporation, Lotus Notes Knowledge Base, "What is the Notes Repilcator", Jul. 5, 1995.
Lotus Notes Advisor, Advisor Publications, Aug. 1995, entire magazine.
Grous, Paul J., "Creating and Managing a Web Site with Lotus' InterNotes Web Publisher", The View Technical Journal for Lotus NotesÒ Software, vol. 1, Issue 4, Sep./Oct. 1995, pp. 3-18.
Lotus Notes Advisor, Advisor Publications, Oct. 1995, entire magazine.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Balaban, Bob, "This is Not Your Father's Basic: LotusScript in Notes Release 4", Lotus Notes Advisor, Advisor Publications, vol. 1, No. 5, Nov./Dec. 1995, pp. 31-58.
Pyle, Lisa, "A Jump Start to the Top Ten R3-to-R4 Migration Considerations", Lotus Notes Advisor, Advisor Publications, vol. 1, No. 5, Nov./Dec. 1995, pp. 3-20.
Lotus Notes Advisor, Advisor Publications, Dec. 1995, entire magazine.
Lotus Development Corporation, Lotus Notes Release 4 Install Guide for Workstations, First Revision, 1996.
Freeland, Pat and Londergan, Stephen, Lotus Notes 4 for Dummies™, IDG Books Worldwide, 1996.
Kreisle, Bill, Teach yourself . . . Lotus Notes 4, MIS: Press, 1996.
Marmel, Elain, Easy LotusÒ Notes Release 4.0, Que Corporation, 1996.
Lotus Development Corporation, Lotus Notes Server Up and Running!, Release 4, 1996.
Falkner, Mike, "How to Plan, Develop, and Implement Lotus Notes in Your Organization", Willy Computer Publishing, John Wiley and Sons, Inc., 1996.
Lamb, John P., et al., "Lotus Notes Network Design", McGraw-Hill, 1996.
Tamura, Randall A., et al., Lotus Notes 4 Unleashed, Sams Publishing, 1996.
Dahl, Andrew, Lotus Notes 4 Administrator's Survival Guide, Sams Publishing, 1996.
Netscape Communications Corporation, Administrator's Guide, Netscape News Server, Version 2.0, 1996.
Lotus Development Corporation, Lotus Notes Internet Cookbook for Notes Release 3, Jan. 16, 1996.
Wong, Harry, "Casahl's Replic-Action: Delivering True Notes/DBMS Integration", The View Technical Journal for Lotus Notes Software, vol. 2, Issue 1, Jan./Feb. 1996, pp. 33-50.
Lotus Notes Advisor, Advisor Publications, Jan./Feb. 1996, entire magazine.
IBM International Technical Support Organization, Lotus Notes Release 4 In a Multiplatform Environment, Feb. 1996.
Lotus Development Corporation, Lotus Notes Internet Cookbook for Notes Release 4, Feb. 14, 1996.
Blaney, Jeff, "You Can Take it with you: An Introduction to Mobile Computing with Notes R4", The View Technical Journal for Lotus Notes Software, vol. 2, Issue 1, Jan./Feb. 1996, pp. 22-32.
Lotus Notes Advisor, Advisor Publications, Apr. 1996, entire magazine.
Frankel, Garry, "Pumping for Info: Notes and Database Integration", Network Computing, May 1, 1996, pp. 76-84.
Lotus Development Corporation, Lotus Notes Knowledge Base, "Firewall Security Overview and How Firewalls Relate to Lotus Notes", May 22, 1996.
Lotus Notes Advisor, Advisor Publications, Jun. 1996, entire magazine.
Augun, Audry, "Integrating Lotus Notes with Enterprise Data", Lotus Notes Advisor Publications, Jul./Aug. 1996, pp. 22-25.
Lotus Notes Advisor, Advisor Publications, Aug. 1996, entire magazine.
IBM Corporation, Secrets to Running Lotus Notes: The Decisions No One Tells You How to Make, Oct. 1996.
Lotus Notes Advisor, Advisor Publications, Oct. 1996, entire magazine.
Opyt, Barbara, et al., "Use the Internet as Your Lotus Notes WAN", Lotus Notes Advisor, Advisor Publications, Nov./Dec. 1996, pp. 17-20.
Lotus Notes Advisor, Advisor Publications, Dec. 1996, entire magazine.
Swedeen, Bret, et al., "Under the Microscope: Domino Replication", LDD Today, Oct. 1, 1998.
Lotus Development Corporation, Lotus Inside Notes: The Architecture of Notes and the Domino Server, 2000.
"The History of Notes and Domino", Lotus Developer Domain, Lotus, Sep. 29, 2003.

* cited by examiner

SYSTEMS AND METHODS FOR SIMPLIFIED PROVISIONING

BACKGROUND OF THE INVENTION

1. Field of the Invention

The present invention relates generally to service activation, and more particularly to systems and methods for simplified provisioning.

2. Description of Related Art

Conventionally, a user purchasing services associated with a device needs to register with a service provider to provide specific information about the user. The service provider often has a customer service center that assists the user with registration for various services associated with the wireless device. For instance, the customer service center can record personal information about the user in order to provide wireless Internet services. The service provider typically requires billing information from the user in order to identify the user and collect monies from the user for the services being provided.

When the user activates various services, the service provider may program various databases with the user's personal information, as well as information associated with the device the user is using to access the services. This process may be referred to as "provisioning." Often, the user spends time on the phone with a representative of the service provider in order to provide the information the service provider requires in order to program the various databases. Alternatively, the user may spend time on a device associated with the user in order to provide the requisite information for the provisioning. In exchange for providing the information to the service provider, the user obtains access to certain resources made available by the service provider.

Collecting the user's personal information and storing the information in the databases is frequently done in order to maintain security and ensure that each user pays for the resources being requested. However, users often resent the time it takes to register for access to the resources. Further, users may register many times with the same service provider for different resources available via the service provider. Numerous minutes or hours spent entering information required by the service provider may deter users from subscribing to the various resources offered by the service provider.

Therefore, there is a need for a system and method for simplified provisioning.

SUMMARY OF THE INVENTION

The present invention provides a system and method for simplified provisioning. In a system according to one embodiment, a server for storing information associated with a user during a non-provisioning event and for forwarding one or more communications to the user related to a provisioning event based on the information stored is provided.

In a method according to another embodiment, information associated with a user during a non-provisioning event is stored. The information is utilized to pre-fill a registration related to a provisioning event. One or more communications are forwarded to the user requesting information to complete the registration for the provisioning event based on the information stored.

DESCRIPTION OF EXEMPLARY EMBODIMENTS

Figure 1:
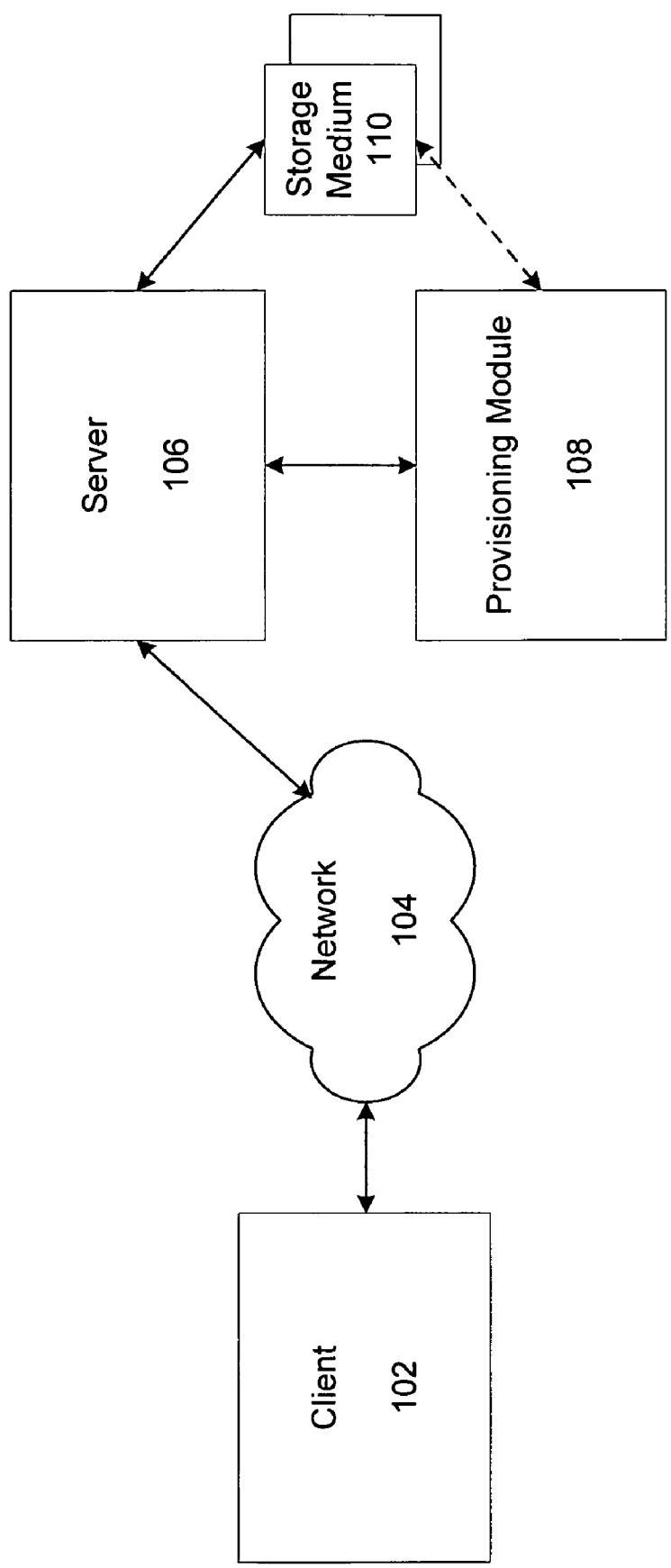
FIG. 1 shows an exemplary environment for providing simplified provisioning in accordance with one embodiment.

Referring to FIG. 1, an exemplary environment for providing simplified provisioning in accordance with one embodiment is shown. A client 102 communicates with a server 106 via a network 104. The client 102 may include any type of device, such as a cellular telephone, a personal digital assistant (PDA), a personal computer, etc.

Any type of provisioning may be provided according to various embodiments. For instance, the provisioning may include an event registering a user in response to a user request for services, a communication to the user offering services, a communication to the user including activation data, a communication to the user with a uniform resource locator (URL) where the user can obtain additional information regarding services, and so on ("provisioning event"). Any type of provisioning event is within the scope of one embodiment.

Similarly, any type of services provided by a service provider managing the provisioning events is possible. For instance, the service provider may provide internet services, application services, wireless services, and so on.

A provisioning module 108 may be coupled to the server 106 for providing provisioning event related services. In one embodiment, the provisioning module 108 is included as a component of the server 106. In another embodiment, the provisioning module 108 provides provisioning event related processing for various servers.

The server 106 may include or otherwise have access to one or more storage mediums 110. Any type of storage medium 110 may be employed according to various embodiments. In FIG. 1., the server 106 is coupled to the storage medium(s) 110 for storing and accessing information included in the storage medium(s) 110.

In an exemplary embodiment, the client 102 contacts the server 106 via the network 104 in order to request and/or access services provided by a service provider associated with the server 106. For example, a user at the client 102 may wish to subscribe to email services available by the service provider. The server 106 requests information about the user at the client 102, or about the client 102, itself before allowing the user to access services. In order to verify that the client 102 is genuine, the server 106 may access the storage medium (s) 110 to match data provided by the client 102 with information the server 106 stored in the storage medium(s) 110 as a result of prior encounters with the client 102.

Any manner of collecting information associated with the user and/or the device 102 associated with the user may be employed. The server 106 may collect the information from previous encounters with the device 102, from other service providers associated with the user and/or the device 102, and/or from any sources providing information about the user and/or the device 102.

The server 106 utilizes the provisioning module 108 to provide specified services and configurations for those services to the user at the client 102. The provisioning module 108 may verify information associated with the client 102 in one embodiment. The provisioning module 108 may have access to the storage medium(s) 110 via the server 106 or via a direct connection to the storage medium(s) 110.

Figure 2:
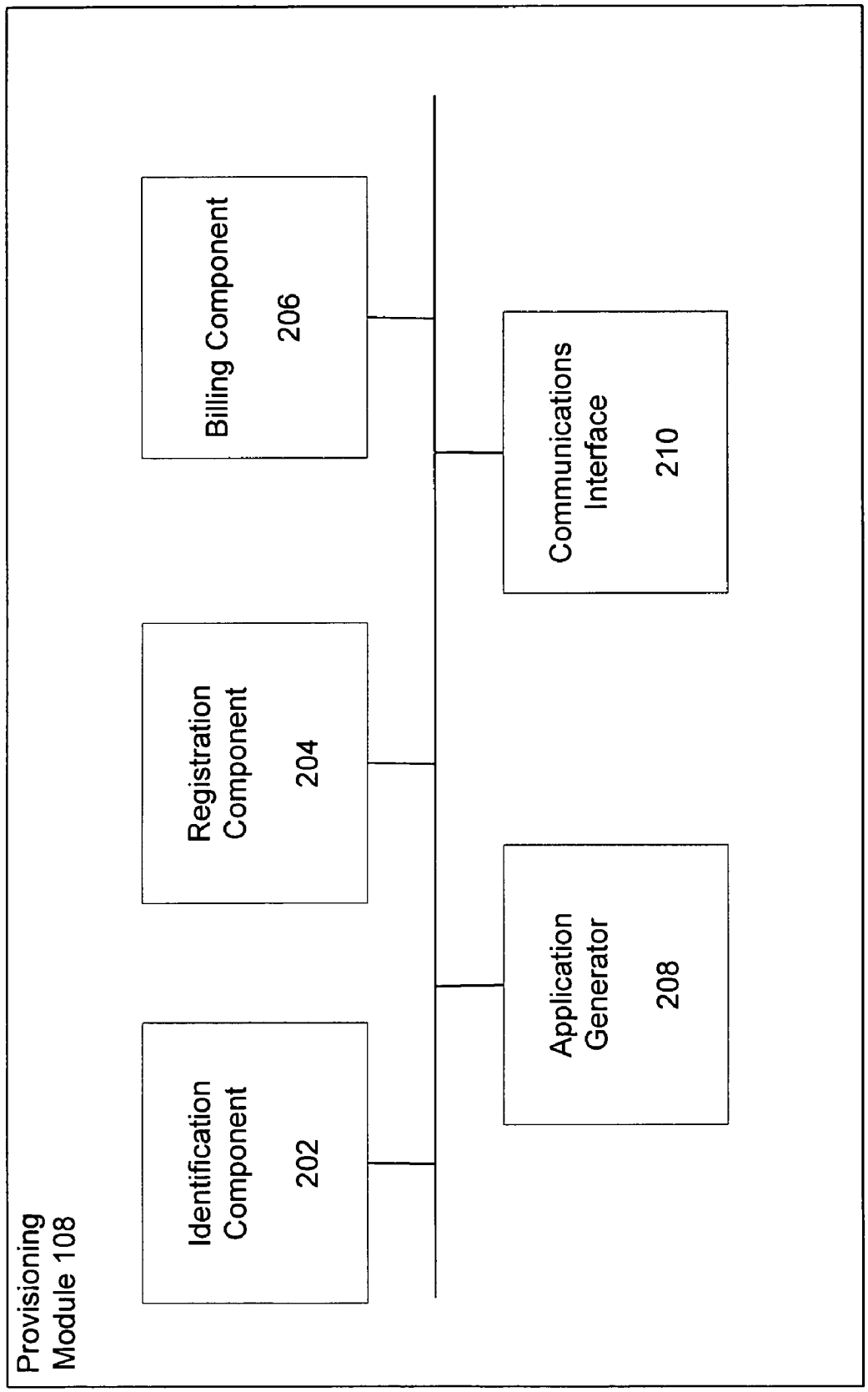
FIG. 2 shows a schematic diagram of an exemplary provisioning module in accordance with one embodiment.

Turning now to FIG. 2, a schematic diagram of an exemplary provisioning module 108 in accordance with one embodiment is shown. The provisioning module 108 may provide users with accounts, the appropriate access to those accounts, all the rights associated with those accounts, all of the resources necessary to manage the accounts, and so forth. Provisioning may be utilized to refer to service activation and may also involve programming various databases, such as the storage medium(s) 110, with the user's information, as discussed herein. Although the server 106 may be identified as performing various functions, any of the functions may be performed by the provisioning module 108 and/or components thereof.

The provisioning module 108 may include an identification component 202. The identification component 202 may perform various tasks related to identifying the client 102 and/or the user associated with the client 102. The identification component 202 may assign an identifier to the client 102 and/or information associated with the user at the client 102 when the client 102 is connected to the server 106. The identification component 202 may store the information in the storage medium(s) 110 according to the identifier the identification component 202 associates with the information.

In one embodiment, the identification component 202 assigns a unique identifier, such as a number string, to the client 102 and stores the information associated with the client 102 according to the unique identifier. The identification component 202 may then forward the unique identifier to the client 102 as a communication, or part of a communication, so that the client 102 can provide the unique identifier when the client 102 connects to the server 106 on another occasion.

In another embodiment, a phone number associated with the client 102 is utilized by the identification component 202 to store information associated with the client 102. Accordingly, when the client 102 makes further contact with the server 106, the phone number may be used to access the information stored according to the phone number. The user may provide the phone number associated with the client 102 and/or the client 102 may provide the phone number to the server 106 when initial access to the server 106 is gained by the client 102.

The identification component 202 may also compare information provided by the user of the client 102 with information stored in the storage medium(s) 110 related to the client 102. The comparison may be performed in order to verify that the user of the client 102 is the same user of the client 102 about which the server 106 captured information during a previous encounter. The comparison may also be performed to ensure that the client 102 information in the storage medium(s) 110 is accurate.

For instance, if the phone number is utilized as the identifier and the phone number provided by the user at the client 102 in response to a query is different from the phone number in the storage medium(s) 110, the user may have entered the phone number incorrectly, the original information gathered at the server 106 may have been entered incorrectly, and so on. The information from the storage medium(s) 110 and the client 102 may be compared for any reason. As discussed herein, the server 106 may collect the information associated with the user and/or the client 102 during previous encounters with the client 102 and/or from any other sources.

A registration component 204 may also be included with the provisioning module 108. The registration component 204 can utilize information from the storage medium(s) 110 to "pre-fill", or to otherwise fill in information associated with, a registration for the user associated with the client 102. The server 106 captures information about the user when the client 102 accesses the server 106 initially and/or from any other source, as discussed herein.

For example, when the client 102 logs onto the server 106 to check email, the server 106 may capture the phone number of the client 102, the username of the user associated with the client 102, or any other information associated with the client 102. The information is stored in the storage medium(s) 110 according to a unique identifier assigned by the identification component 202, according to the phone number associated with the client 102, or according to any other method. When the client 102 logs onto the server 106 again in order to request instant messaging services, for example, the registration component 204 accesses the information in the storage medium(s) 110 in order to complete a registration for the user at the client 102 requesting the services.

The registration component 204 can then query the user for any information needed for registration that is not included in the information in the storage medium(s) 110. In one embodiment, information associated with the user and the client 102 is collected by the server 106 from other sources, rather than from a previous encounter the client 102 had with the server 106, as discussed herein. For instance, another service provider may forward information associated with the client 102, the server 106 may access information about the client 102 on available databases utilizing the phone number or other information about the client 102, and so forth. Any manner of gathering information about the client 102 to pre-fill the registration for services is within the scope of an embodiment.

The registration component 204 can register the user at the client 102 for any services offered by the service provider associated with the server 106, or otherwise. In one embodiment, the registration component 204 can pre-fill information related to services being requested by the user other than identification information. For instance, the server 106 may store information related to user preferences in the storage medium(s) 110. When the user requests services, the registration component 204 may utilize the user preferences information to pre-fill feature selections associated with the requested services. For example, the registration component 204 may pre-select calendar features for the user according to user preferences captured by the server 106 about user activity related to other services, whether those services are offered by the service provider or not.

A billing component 206 may be included with the provisioning module 108. The billing component 206 can track user activity of the services provided by the service provider. Accordingly, the billing component 206 can determine when to bill the user for the services being provided. The registration component 204 can provide user information to the billing component 206 that may be needed regarding where to bill the user, such as an email address, for instance.

An application generator 208 may be included with the provisioning module 108 for configuring the application and/or services requested by the user for the device 102 associated with the user. The application generator 208 can also create the application for the user including any features the user desires. Any type of application generator 208 may be provided.

In one embodiment, the application generator 208 may utilize provisioning templates to create the profiles for configuring various devices, such as the client 102 (FIG. 1) associated with the user. For instance, the templates may provide the parameters for creating a particular application. The user can also specify customizations to the application, which can be used to modify the template for the application by the application generator 208. In other words, the provisioning templates can provide parameters for configuring various devices for the services as well as customizing the actual service features.

A communications interface 210 may also be provided with the provisioning module 108. The communications interface 210 receives communications from the user and/or the server 106 and processes the input utilizing the components discussed herein.

Although the provisioning module 108 is described as including various components, the provisioning module 108 may include more components or fewer components than those listed and still fall within the scope of an embodiment of the invention. For example, the provisioning module 108 may also include business rules for building the applications, a customer service component for managing applications and errors, a protocol configuration component for managing a variety of protocols associated with various devices, and so forth.

Figure 3:
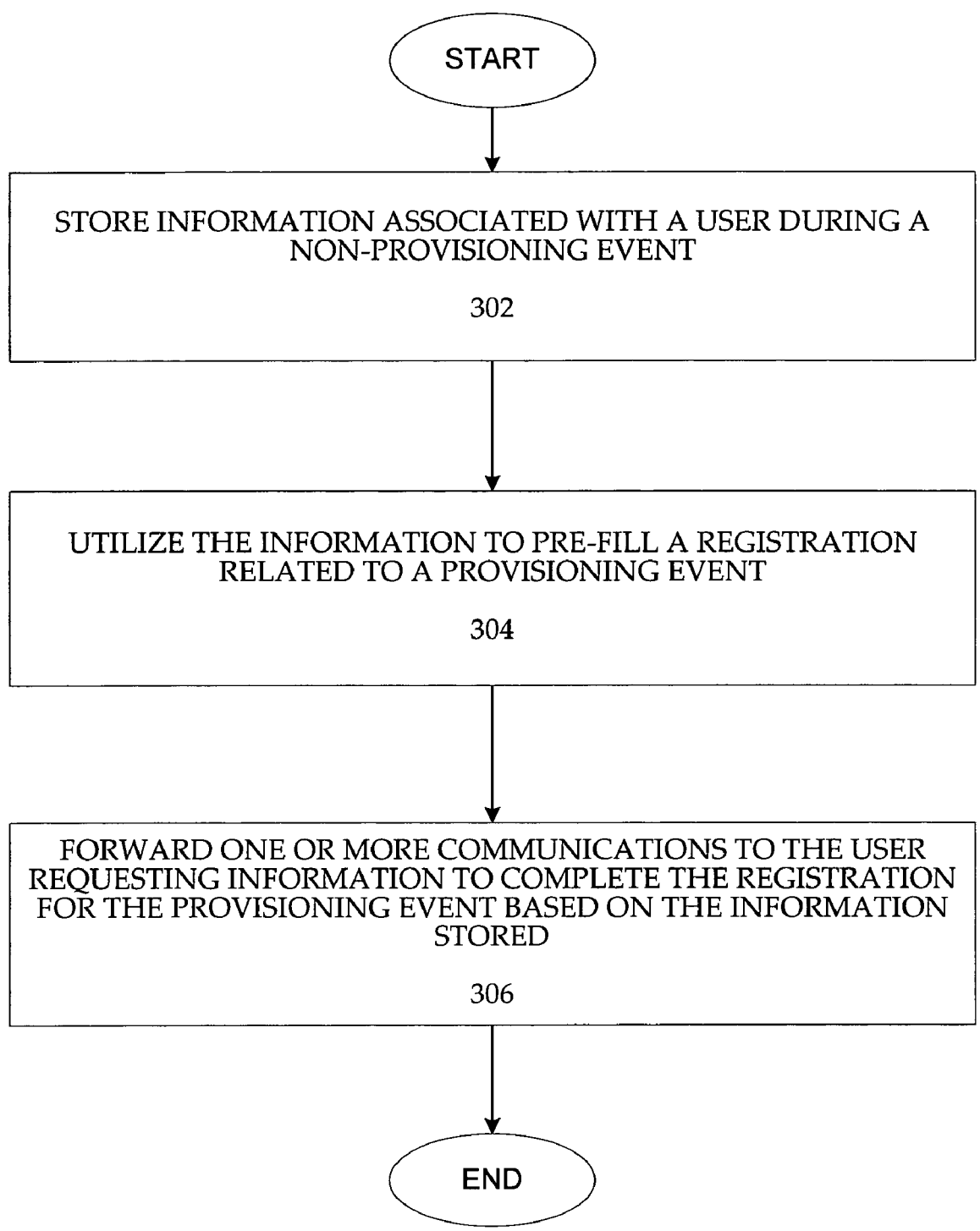
FIG. 3 shows a flow diagram of an exemplary process for providing simplified provisioning in accordance with one embodiment.

FIG. 3 shows a flow diagram of an exemplary process for providing simplified provisioning in accordance with one embodiment. At step 302, information associated with a user during a non-provisioning event is stored. As discussed herein, the information may be stored in the storage medium (s) 110. The server 106 collects information about the user and the client 102 associated with the user when contact is made with the server 106 at a time when provisioning is not occurring. In one embodiment, as discussed herein, the server may collect information related to the user and the client 102 from another source, rather than from the client 102, which also may constitute a non-provisioning event.

In one embodiment, the information related to the user and the client 102 may be collected during one or more previous provisioning events. For instance, the server 106 may store information associated with the user and the client 102 during previous provisioning events in order to avoid or limit querying the user for the same information during future provisioning events.

The information may be stored according to a phone number associated with the device 102 and/or according to a unique identifier assigned to the device 102. For example, the server 106 may assign a unique identifier to the information collected from the device 102 when the device 102 is connected to the server 106. In order to associate the unique identifier to the device 102 for recognition during future contact with the server 106, a text message, for example, can be sent to the device 102 with the unique identifier. The unique identifier may then be sent back to the server 106 to identify the device 102 if the phone number, for example, cannot be accessed by the server 106. As discussed herein, in one embodiment, the server 106 receives information about the user and/or the client 102 from a third party source and stores the information according to the phone number and/or a unique identifier.

At step 304, the information is utilized to pre-fill a registration related to a provisioning event. The information collected by the server 106 from the client 102 during a previous contact with the server 106 and/or from another source (e.g., phone network) is utilized to complete as much of a registration as possible without user input. Accordingly, the user at the client 102 is not required to provide information that the server 106 can access itself.

At step 306, one or more communications are forwarded to the user. The one or more communications are based on the information stored and request information to complete the registration for the provisioning event. In one embodiment, the information requested to complete the registration includes a user query to verify that the information used to complete the registration is correct. The information requested may include a user query to provide a password to complete the registration process, in another embodiment.

By using the information collected by the server 106 during a non-provisioning event that occurred prior to a current provisioning event to complete a registration, or a portion of the registration, the user at the client 102 can provide less information than required if no information about the user was accessible or utilized to pre-fill the registration. Accordingly, the user at the client 102 is provided with simplified provisioning.

Figure 4:
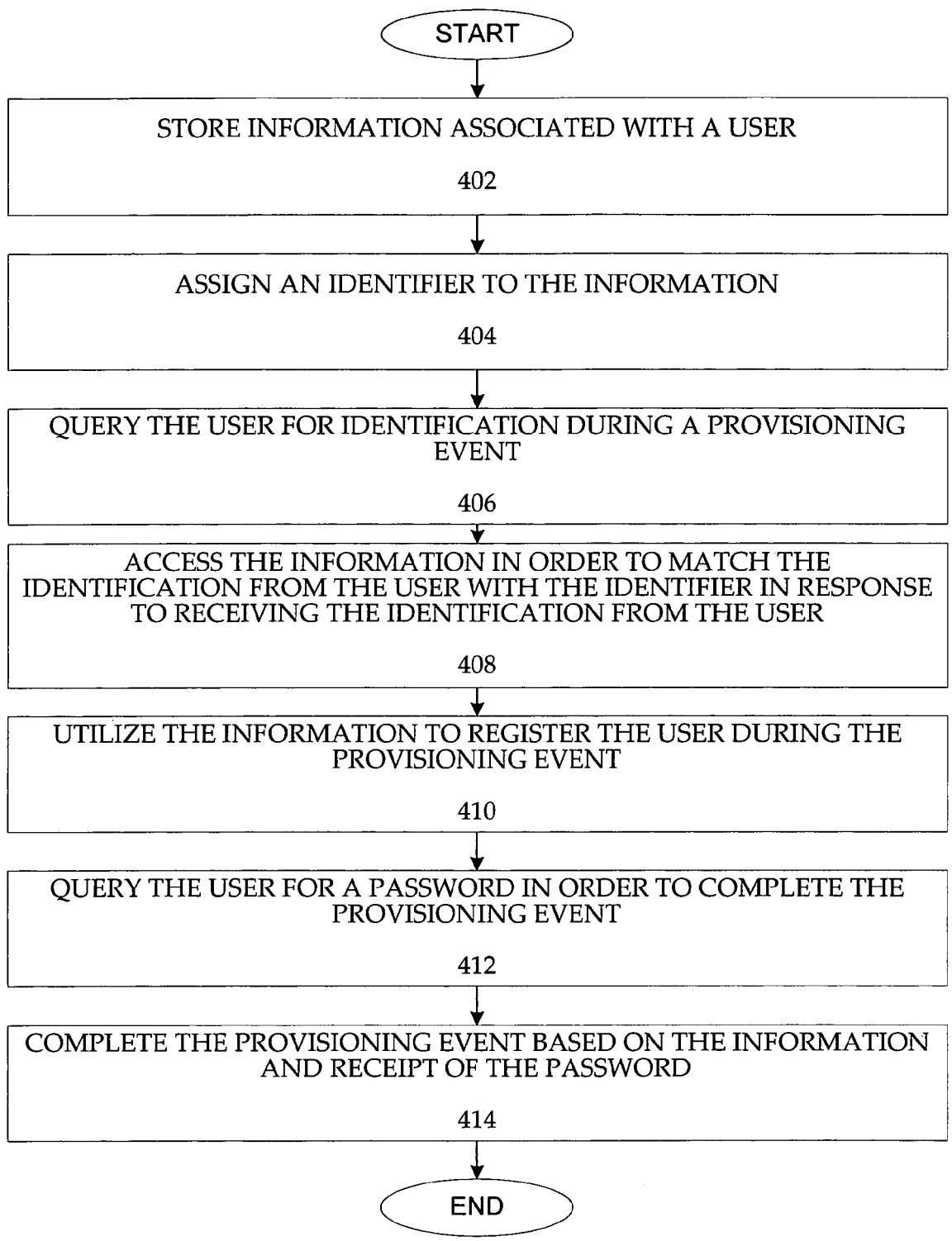
FIG. 4 shows a detailed process for providing simplified provisioning in accordance with one embodiment

Turning now to FIG. 4, a detailed process for providing simplified provisioning in accordance with one embodiment is shown. At step 402, information associated with a user is stored. As discussed herein, the information may be stored by the server 106 to one or more storage mediums, such as the storage medium(s) 110 discussed in FIG. 1.

An identifier is assigned to the information at step 404. The identifier may be assigned to the information in order to locate the information in the storage medium(s) 110, in order to compare the information with other information provided by the user during future contacts with the server 106, and so on. The identifier may be assigned to the information for any reason. As discussed herein, the identifier may be a phone number associated with a device of the user, such as the device 102 discussed in FIG. 1, a unique identifier assigned by the identification component 202 of the provisioning module 108 associated with the server 106, and/or any other type of identifier.

At step 406, the user is queried for identification during a provisioning event. The identification sought from the user may be confirmation of the identifier used to store the information at step 404, such as the phone number and/or the unique identifier. The identification sought, however, may be any type of information from the user. For example, a "username" may be sought in order to match the username associated with the user with the username stored in the storage medium(s) 110.

At step 408, the information is accessed in order to match the identification from the user with the identifier associated with the information in response to receiving the identification from the user. The provisioning module 108 accesses the information in the storage medium(s) 110, directly or via the server 106, associated with the user and compares that information with the identification received from the user in response to the query.

By locating the information in the storage medium(s) 110 that was previously collected, the information can be utilized to register the user during the provisioning event at step 410. The information can complete the registration or a portion of the registration associated with the services for which the provisioning event is taking place. By completing the registration or a portion of the registration with information existing about the user and the user device, such as the device 102 discussed in FIG. 1, the user is only required to provide data for the registration not included in the information from the storage medium(s) 110. Thus, the user experiences a streamlined provisioning process.

In one embodiment, as discussed herein, the information is utilized to complete the registration and the user is queried to verify that the information utilized is correct. In another embodiment, the user is queried to verify the accuracy of the information utilized according to a length of time between the provisioning event and when the information was collected.

For instance, if the information was collected by the server 106 less than one month prior to the provisioning event, the server 106 may not seek verification from the user that the information is still accurate.

At step 412, the use is queried for a password in order to complete the provisioning event. The password may help to ensure that an intended user receives services. For instance, the server 106 may forward the communication regarding services to a user that did not request the services or requested the services using another user's information. Provisioning related information may erroneously reach users for a variety of reasons. The user is queried for the password in order to verify that the user matches the intended user. For instance, if the provisioning information is sent to a "user b" rather than the intended "user a", "user b" will likely not know the "user a" password and resultantly will not be able to receive the services intended to go to the "user a."

The provisioning event is completed in response to receiving the password at step 414. The password is compared with a password in the storage medium(s) 110. Provided the password matches the password known for the particular user, the provisioning event may be completed. In one embodiment, the server 106 accesses another database with user password information in order to confirm that the password provided is correct. Any method of verifying the password may be employed.

As discussed herein, the information from the storage medium(s) 110 may be sufficient for completing the registration for the service provider. However, the service provider may require additional information to complete the registration. For instance, the information about the user and/or the client 102 associated with the user the server 106 originally captured may not provide enough information about the user and/or the client 102 required for the registration for the services associated with the provisioning event. Accordingly, more information may be collected from the user. As part of the simplified provisioning process described in FIG. 4, or any other exemplary provisioning process, the user may be queried for additional information to complete the registration.

In one embodiment, the server 106 stores information associated with the user during the client 102 connection with the server sometime prior to the provisioning event. Using the provisioning templates, discussed in FIG. 2 in connection with the application generator 208, the server 106 may collect other information about the user from third party databases in order to complete registration for provisioning for many of the service provider's services based on the provisioning templates. Any type of method for gathering information about the user and/or the device 102 associated with the user for simplifying provisioning is within the scope of various embodiments.

While various embodiments have been described above, it should be understood that they have been presented by way of example only, and not limitation. For example, any of the elements associated with the provisioning module may employ any of the desired functionality set forth hereinabove. Thus, the breadth and scope of a preferred embodiment should not be limited by any of the above-described exemplary embodiments.

What is claimed is:

1. A method for provisioning a computing device with a service, the method comprising:
storing information associated with a user of the computing device in a memory of a server, wherein the stored information is a phone number associated with a device of the user, and stored during a non-provisioning event;
executing instructions stored in memory, wherein execution of the instructions by a processor determines that the stored information requires additional information to provision the computing device with the service;
querying the user for additional information not included in the memory of the server, wherein the additional information is required to provision the computing device with the service;
querying the user to verify the phone number provided during a non-provisioning event before forwarding one or more communications associated with provisioning the computing device; and
forwarding one or more communications from the server to the computing device, the one or more communications based on the stored information from the non-provisioning event and the additional information required to provision the computing device with the service.

2. The method of claim 1, further comprising requesting password information from the user.

3. The method of claim 1, wherein the information is stored on the server according to an assigned unique identifier.

4. The method of claim 1, further comprising utilizing the information to register the user for provisioning.

5. The method of claim 1, further comprising pre-filling information associated with the user, wherein the pre-filled information is previously collected by the server and stored in the memory of the server.

6. A system for provisioning a computing device to provide a service, the system comprising:
a memory to store information associated with a user of the computing device, wherein the stored information is a phone number associated with a device of the user, the phone number stored during a non-provisioning event;
a processor to execute instructions stored in memory to:
determine that the stored information includes information required to provision the computing device with the service,
query the user for additional information not included in memory and required to provision the computing device with the service, and
query the user to verify the phone number before forwarding one or more communications associated with provisioning the computing device; and
an interface to forward one or more communications to the computing device, the one or more communications based on the stored information required to provision the computing device with the service.

7. The system of claim 6, further comprising requesting password information from the user.

8. The system of claim 6, wherein the information is stored on the server according to an assigned unique identifier.

9. The system of claim 6, further comprising utilizing the information to register the user for provisioning.

10. The system of claim 6, further comprising pre-filling information associated with the user, wherein the pre-filled information is previously collected by the server and stored in the memory of the server.

11. A computer-readable storage medium having embodied thereon a program, the program being executable by a processor to perform a method, the method comprising:
storing information associated with a user of the computing device in a memory of a server, wherein the stored information is a phone number associated with a device of the user, and stored during a non-provisioning event;
determining that the stored information requires additional information to provision the computing device with the service;

querying the user for additional information not included in the memory of the server, wherein the additional information is required to provision the computing device with the service;

querying the user to verify the phone number provided during a non-provisioning event before forwarding one or more communications associated with provisioning the computing device; and forwarding one or more communications to the computing device the one or more communications based on the stored information from the non-provisioning event and the additional information required to provision the computing device with the service.

12. The computer-readable storage medium of claim 11, further comprising requesting password information from the user.

13. The computer-readable storage medium of claim 11, wherein the information is stored on the server according to an assigned unique identifier.

14. The computer-readable storage medium of claim 11, further comprising utilizing the information to register the user for provisioning.

15. The computer-readable storage medium of claim 11, further comprising pre-filling information associated with the user, wherein the pre-filled information is previously collected by the server and stored in the memory of the server.

* * * * *